United States Patent [19]

Hashimoto

[11] Patent Number: 4,830,134
[45] Date of Patent: May 16, 1989

[54] MOTORCYCLE STORAGE CONTAINER MOUNTING SYSTEM

[75] Inventor: Michiyoshi Hashimoto, Saitama, Japan

[73] Assignee: Honda Giken Kogyo Kabushiki Kaisha, Tokyo, Japan

[21] Appl. No.: 72,096

[22] Filed: Jul. 10, 1987

[30] Foreign Application Priority Data

Jul. 29, 1986 [JP] Japan .............. 61-116119[U]
Jul. 30, 1986 [JP] Japan .............. 61-116989[U]
Oct. 30, 1986 [JP] Japan .............. 61-167399[U]

[51] Int. Cl.⁴ .............................. B62J 7/00
[52] U.S. Cl. ........................ 180/219; 280/834
[58] Field of Search .............. 180/219, 230; 280/289 A, 5 A; 224/30 R, 32 R, 42.42

[56] References Cited

U.S. PATENT DOCUMENTS 3,937,484 2/1976 Morioka et al. ............. 180/219
3,944,009 3/1976 Katagiri ..................... 180/219
4,359,233 11/1982 Jackson et al. ............. 280/289 A
4,700,799 10/1987 Kawano ..................... 180/219

FOREIGN PATENT DOCUMENTS 3201325 7/1983 Fed. Rep. of Germany .
3431407 2/1986 Fed. Rep. of Germany .
2249799 5/1975 France .
2519928 7/1983 France .
60-169070 2/1985 Japan .
180956 6/1922 United Kingdom .............. 280/5 A
1448663 9/1976 United Kingdom .

Primary Examiner—John A. Pekar
Attorney, Agent, or Firm—Lyon & Lyon

[57] ABSTRACT

A motorcycle frame structure is provided with means for mounting a fuel tank in a lower region of the structure and a storage container thereabove thereby to improve operating performance of the vehicle by lowering its center of gravity. The elevated disposition of the storage container facilitates access to the container whereby articles stored in the container can more readily be deposited therein or retrieved therefrom.

15 Claims, 11 Drawing Sheets

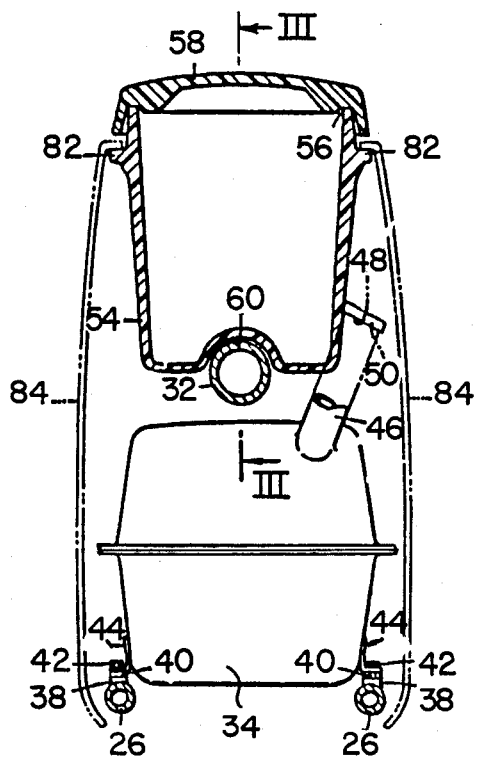
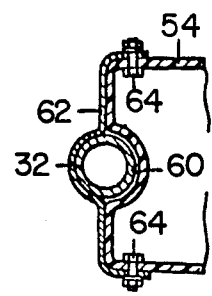
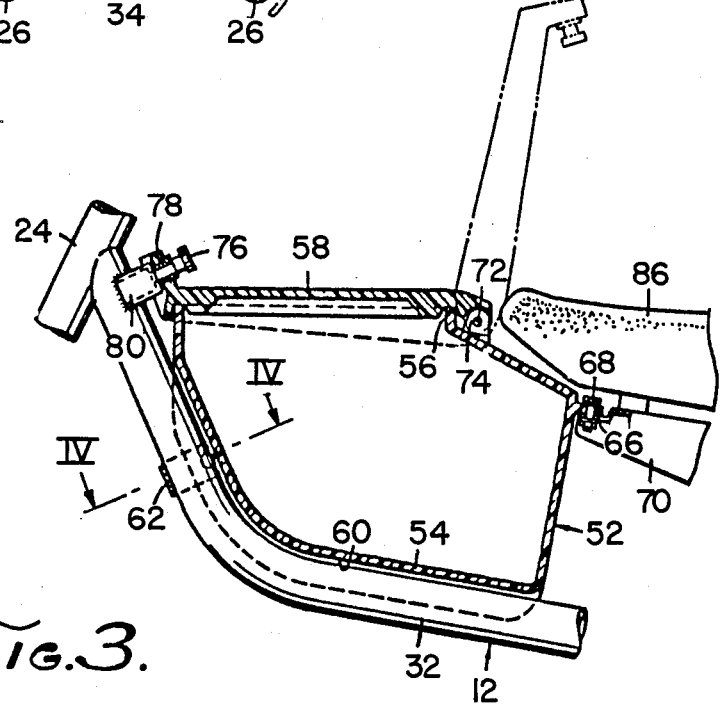

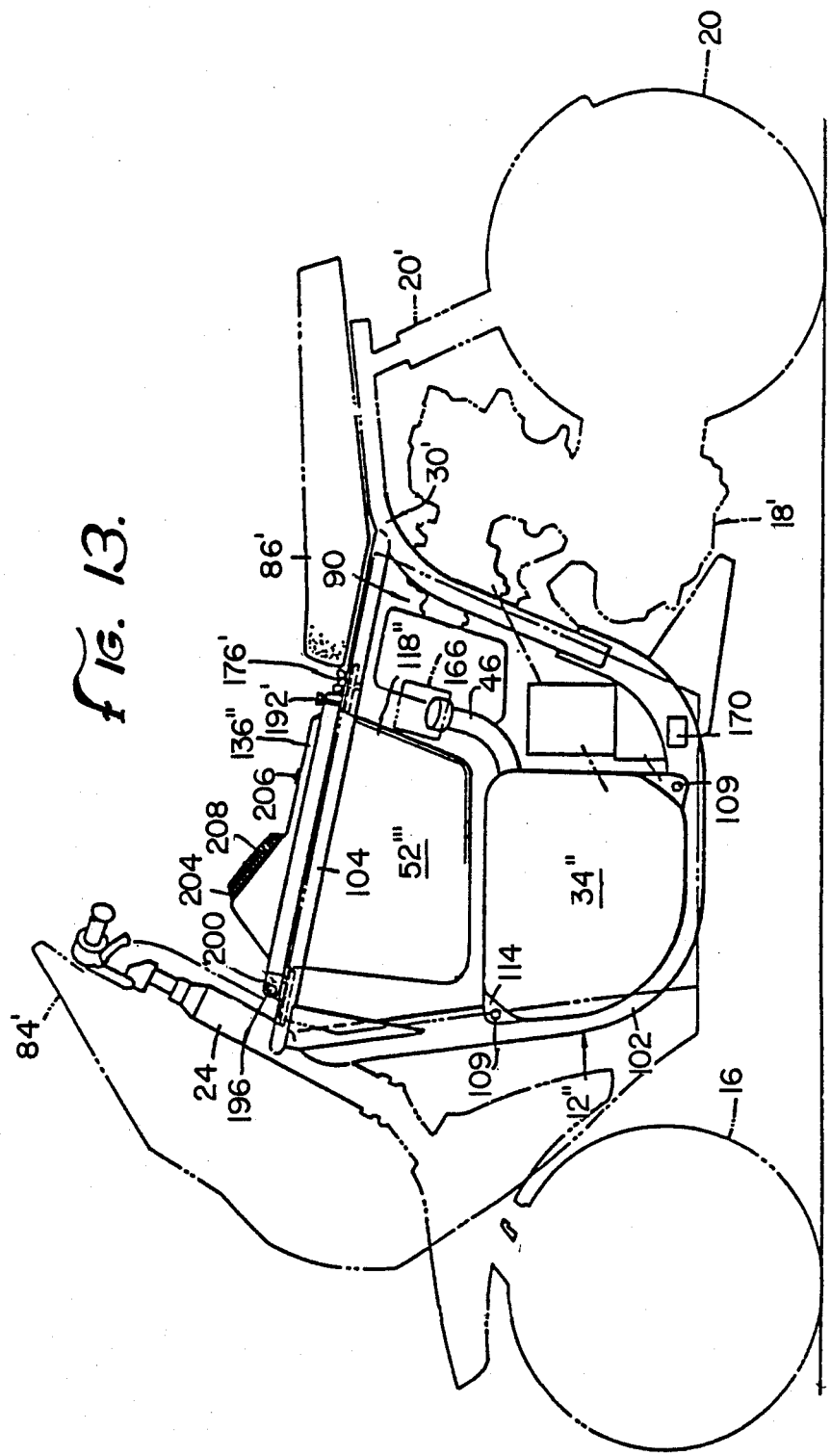

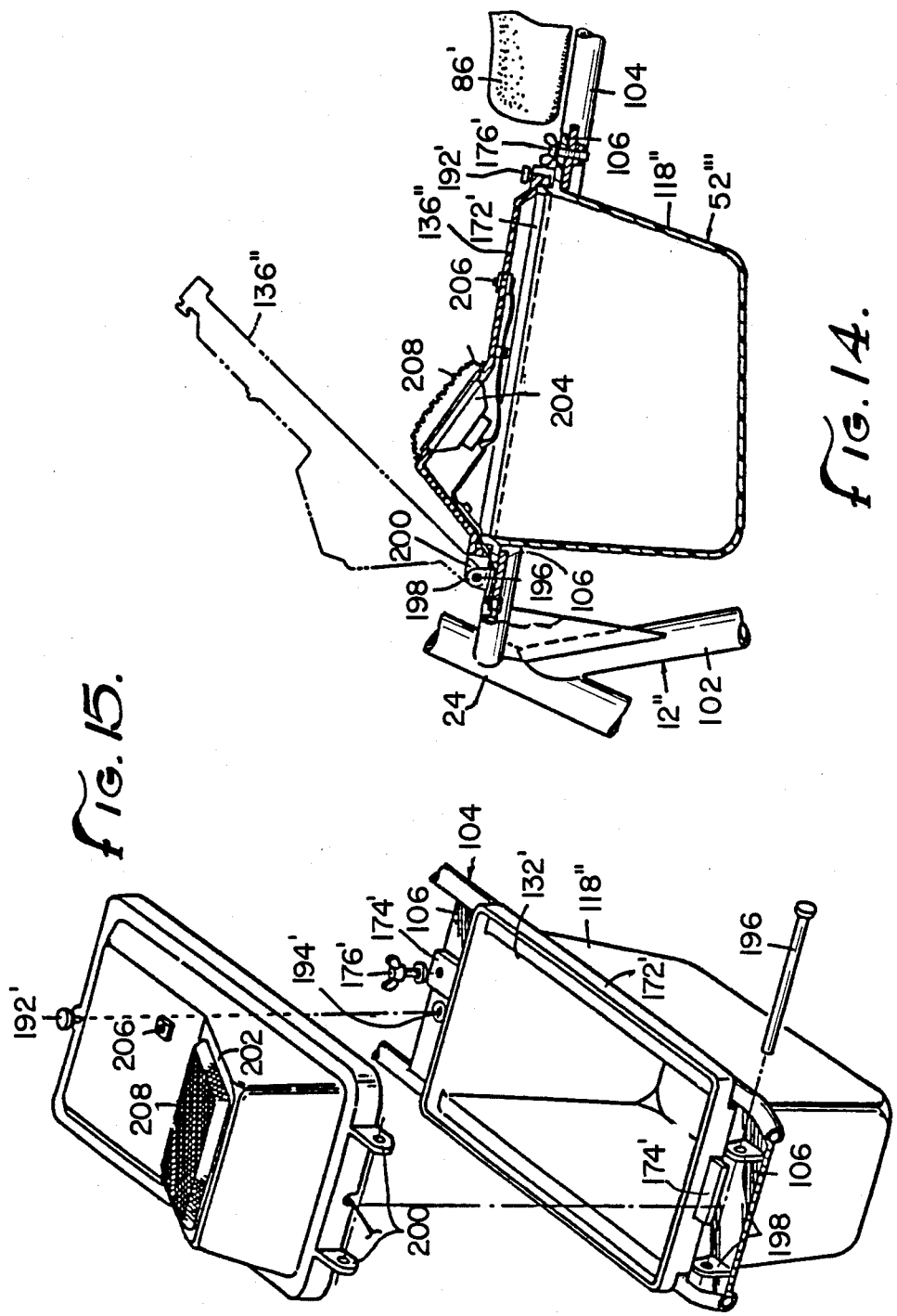

4,830,134

MOTORCYCLE STORAGE CONTAINER MOUNTING SYSTEM

BACKGROUND OF THE INVENTION

The present invention relates to motorcycles. More particularly, the invention relates to motor vehicles of the bicycle type in which the frame structure, which steerably carries a front fork rotatably mounting the front wheel and pivotally suspends a power unit that drivingly connects a rear wheel, also provides means for mounting a storage container for storing articles.

Motorcycles, such as that disclosed in Japanese Utility Model Disclosure No. Sho 60-169070, are known in which the storing of articles is provided in the vehicle frame structure between the seat and the head pipe that supports the front fork. However, because in motorcycles of the previously known type, the space for storing articles is disposed beneath the fuel tank with the fuel tank being located in the upper part of the frame structure the center of gravity of the vehicle is necessarily high to the detriment of vehicle operation.

Other disadvantages derive from locating the storage space below the fuel tank. For example, there is a potential inconvenience of soiling the stored articles when fuel is supplied to the fuel tank. Also, accessing the stored articles is difficult, particularly when the vehicle is located in a confined space, as, for example, in a crowded parking area, or the like.

SUMMARY OF THE INVENTION

According to the present invention there is provided a motorcycle-type vehicle in which the rider straddles the vehicle, comprising a frame structure supportive of the rider and arranged for mounting a steerable front wheel, a power unit, and a rear wheel driven by the power unit, the frame structure including structural members supportively positioning a fuel tank intermediate the front and rear wheels and a storage container spaced vertically above the fuel tank.

It is therefore an object of the invention to provide a motorcycle of the concerned type having article storage capabilities that avoid the aforementioned problems.

BRIEF DESCRIPTION OF THE DRAWINGS

FIG. 2 is a sectional view taken along line II—II of FIG. 1;

FIG. 3 is a sectional view taken along line III—III of FIG. 2;

FIG. 4 is a sectional view taken along line IV—IV of FIG. 3;

FIG. 13 is a side elevational view, similar to FIG. 1, illustrating a fourth embodiment of the invention;

FIG. 14 is an elevational sectional view of the article storage compartment of the embodiment of FIG. 13; and FIG. 15 is an exploded oblique representation of the article storage compartment of the embodiment of FIG. 13.

DESCRIPTION OF THE PREFERRED EMBODIMENT

Throughout the description, the words, "front" and "rear", "left" and "right", refer to directions with respect to the forward-moving direction of the vehicle.

Figure 1:
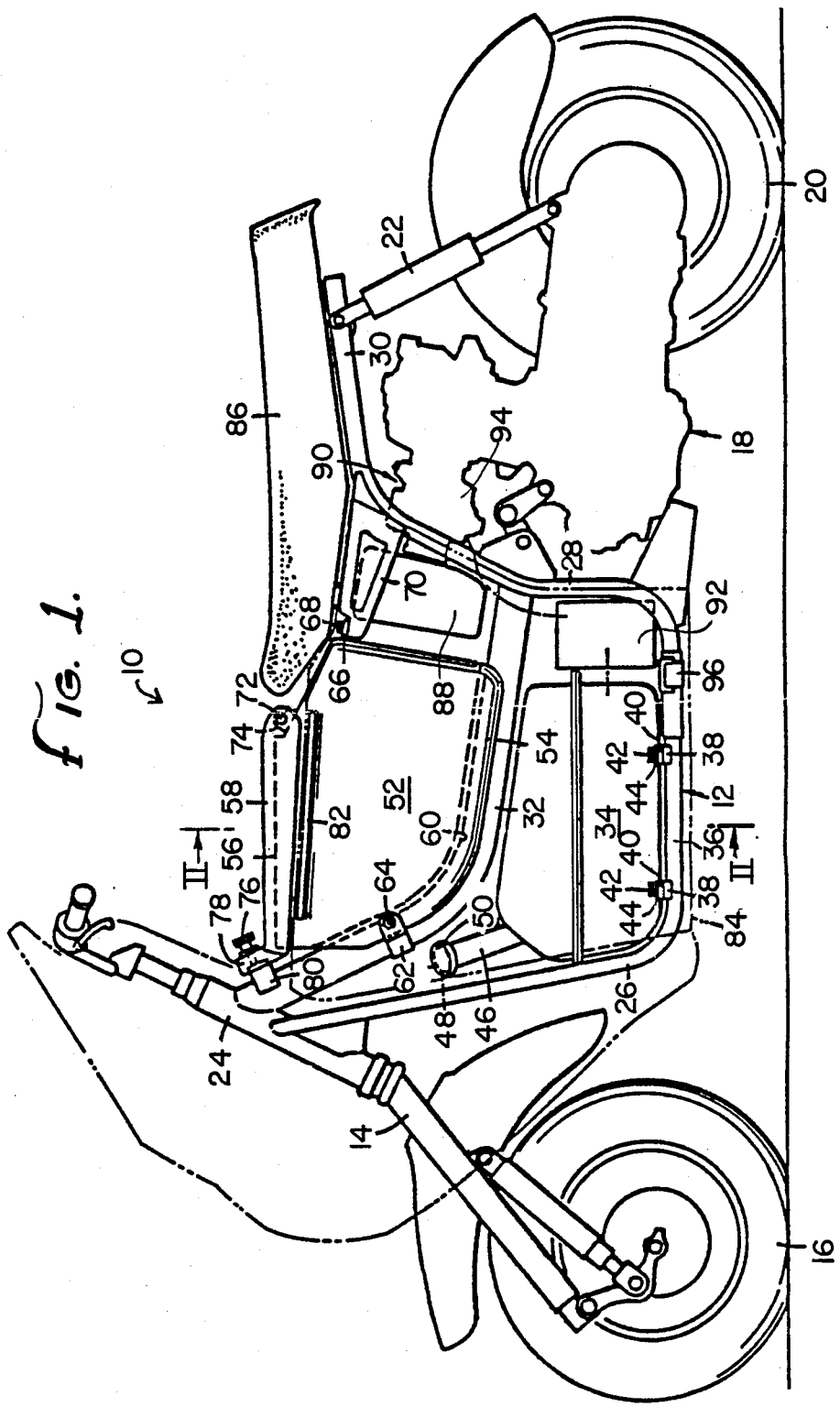
FIG. 1 is a side elevational view, partly in phantom, of a motorcycle incorporating a first embodiment of the invention.
Figure 5:
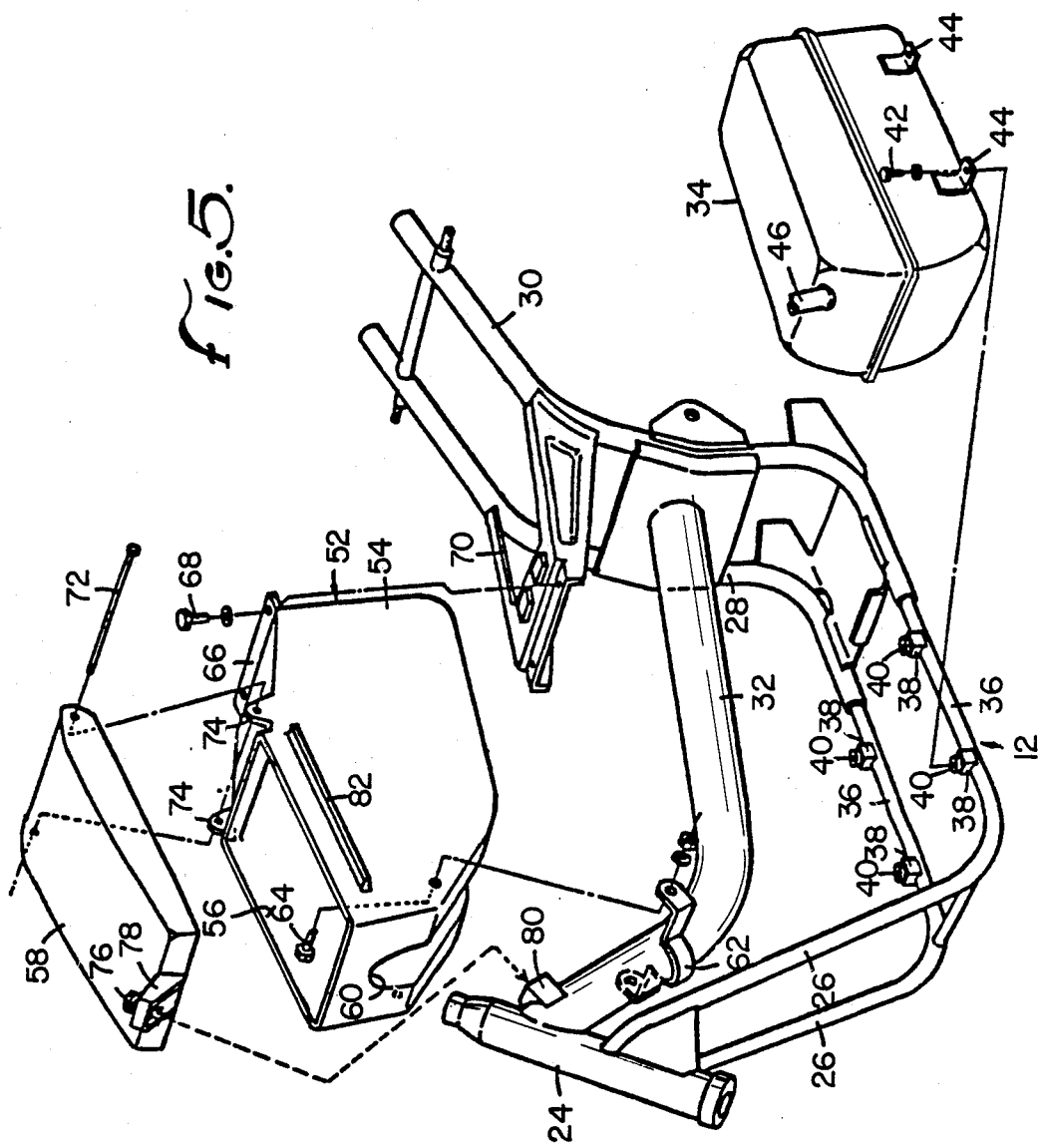
FIG. 5 is an exploded oblique representation of the principal parts of the embodiment of FIG. 1.

With particular reference to FIGS. 1 to 5, there is described a first embodiment of the present invention. FIG. 1 illustrates a motorcycle 10 having a frame structure 12, to the front part of which is steerably supported a front fork 14 that rotably mounts a front wheel 16 and to the rear part of which a power unit 18 drivingly connecting a rear wheel 20 is vertically swingably suspended through a rear cushion 22. As shown in FIG. 5, the motorcycle frame structure 12 is of double cradle type, comprising a head pipe 24 and a pair of down tubes 26 welded at their front ends to the head pipe 24. Rear frames 28 containing integrally formed, rearwardly extending seat rails 30 are welded to the rear ends of the down tubes 26. A main pipe 32 of greater diameter than the down tubes 26 connects between the head pipe 24 and the rear frames 28.

A fuel tank 34 is mounted on a substantially horizontally extending position 36 of the respective down tubes 26. To accomplish this, four mounting seats 38 bearing cushion pads 40 are spacedly arranged on the portions 36. To these mount seats 38 the fuel tank 34 is secured by bolts 42 engaging fuel tank brackets 44.

A fuel filler tube 46 projects upwardly from the upper part of the fuel tank 34. The distal end of the filler tube 46 is formed with an opening 48 that is closed by a cap 50.

On the main pipe 32 and between the head pipe 24 and the seat rails 30 is secured a storage container 52. The storage container 52 comprises a plastic box-like receptacle 54 having generally rectangularly arranged sides and an opening 56 on the upper side thereof that is closed by a cover 58. The receptacle 54 is provided about its bottom portion with an elongated recess 60 that conforms to the shape of the main pipe 32, such that in mounting the receptacle the main pipe is received in the recess.

The box-like receptacle 54 is secured to the frame structure 12, at the front by a bifurcate bracket 62 welded to the main pipe 32 and whose sides are adapted to receive bolts 64 that extend through openings provided in the sides of the receptacle. At its rear end the receptacle 54 is formed with an integral mounting flange 66 that is adapted to connect by means of bolts 68 with a gusset 70 weldedly attached to and extending forwardly from the seat rails 30.

The cover 58 is pivotally connected to the receptacle 54 at the rear end of opening 56. The pivotal connection is accomplished by means of a pivot pin 72 that extends through holes the cover that align with mounting lugs 74 integrally formed on the receptacle on opposite sides of the opening. The cover 58 can be locked over the opening 56 by means of a lock member 76 provided on a lug 78 that projects forwardly from the front end of the cover. The lock member 76 is adapted to engage a lock-receiving member 80 integrally formed on the front portion of the main pipe 32.

Longitudinally extending projections 82 which project laterally outwardly from the opposed sides of the receptacle 54 are adapted to engage and retain the upper ends of cowling plates 84 that serve to cover the sides of the frame structure 12.

The seat rails 30 adjustably mount a seat 86 under which is located an air cleaner 88 connected to the outer end of an intake system 90 of the power unit 18. Fuel is supplied to the power unit 18 by means of a fuel pump 92 mounted on the lower rear portion of the frame structure 12. The fuel pump 92 operates to pass fuel from the fuel tank 34 to a carburator 94 in the power unit intake system 90.

In FIG. 1, numeral 96 identifies a foot rest on which the vehicle rider places his foot while operating the vehicle.

It will be appreciated that, due to the location of the storage container 52 in the upper part of the frame structure 12, with the lock member 76 disengaged from the receiving member 80 and the cover 58 moved to its open position as shown by the chain lines in FIG. 3, ready access is available to the interior of the receptacle 54 through the opening 56 whereby articles can be easily deposited therein or removed therefrom. Moreover, due to the elevated location of the storage container 52, articles can be placed in or taken from the receptacle 54 without hinderance notwithstanding the fact that the vehicle may be completely surrounded in a confined space. Further, this organization of the storage container 52 with respect to the fuel tank 34 not only insures that articles stored in the compartment will not be soiled by fuel spillage, it also improves driving performance of the vehicle by disposing the center of gravity of the vehicle in a lower portion of the frame structure.

Figure 6:
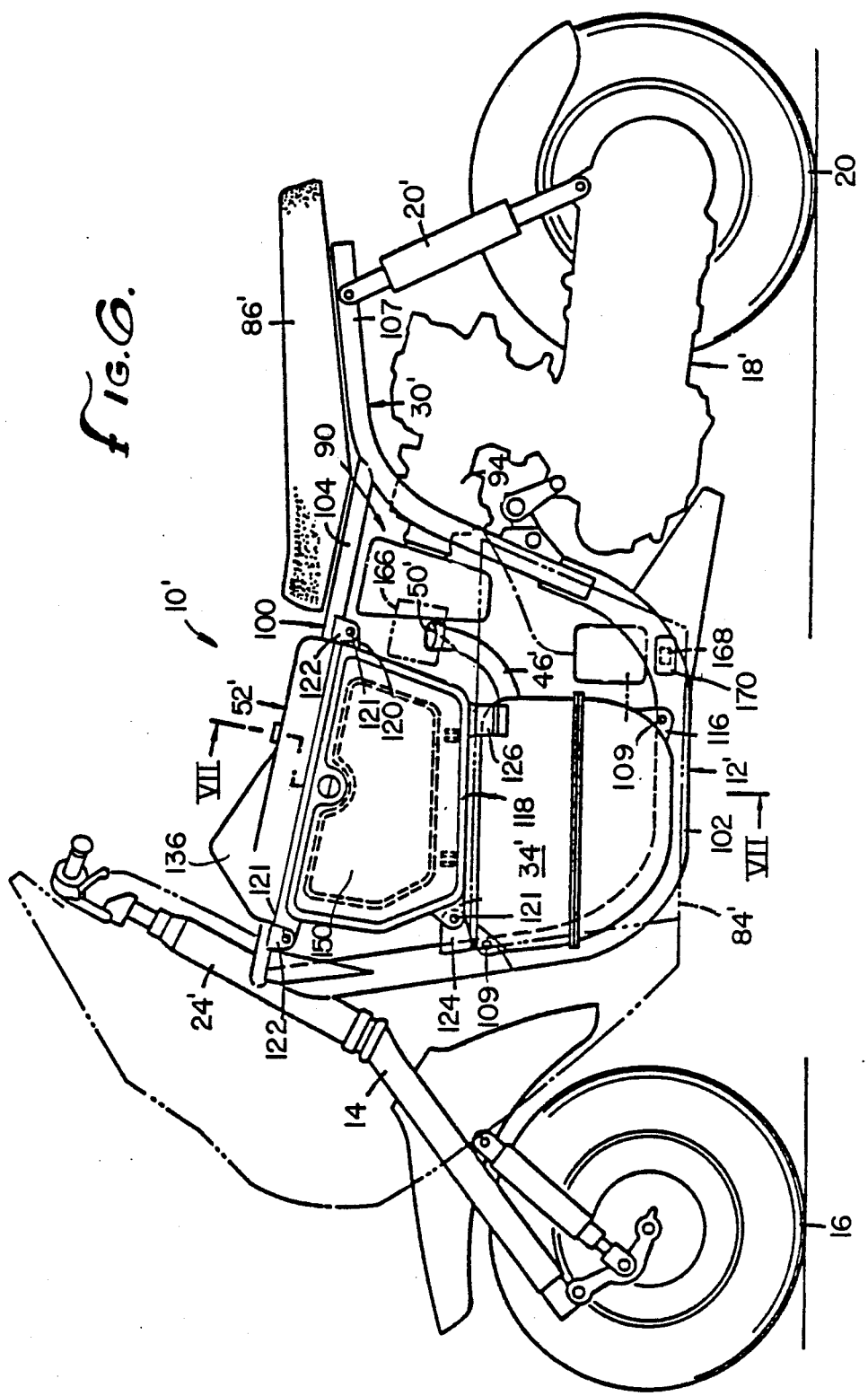
FIG. 6 is a side elevational view, similar to FIG. 1, illustrating a second embodiment of the invention.
Figure 7:
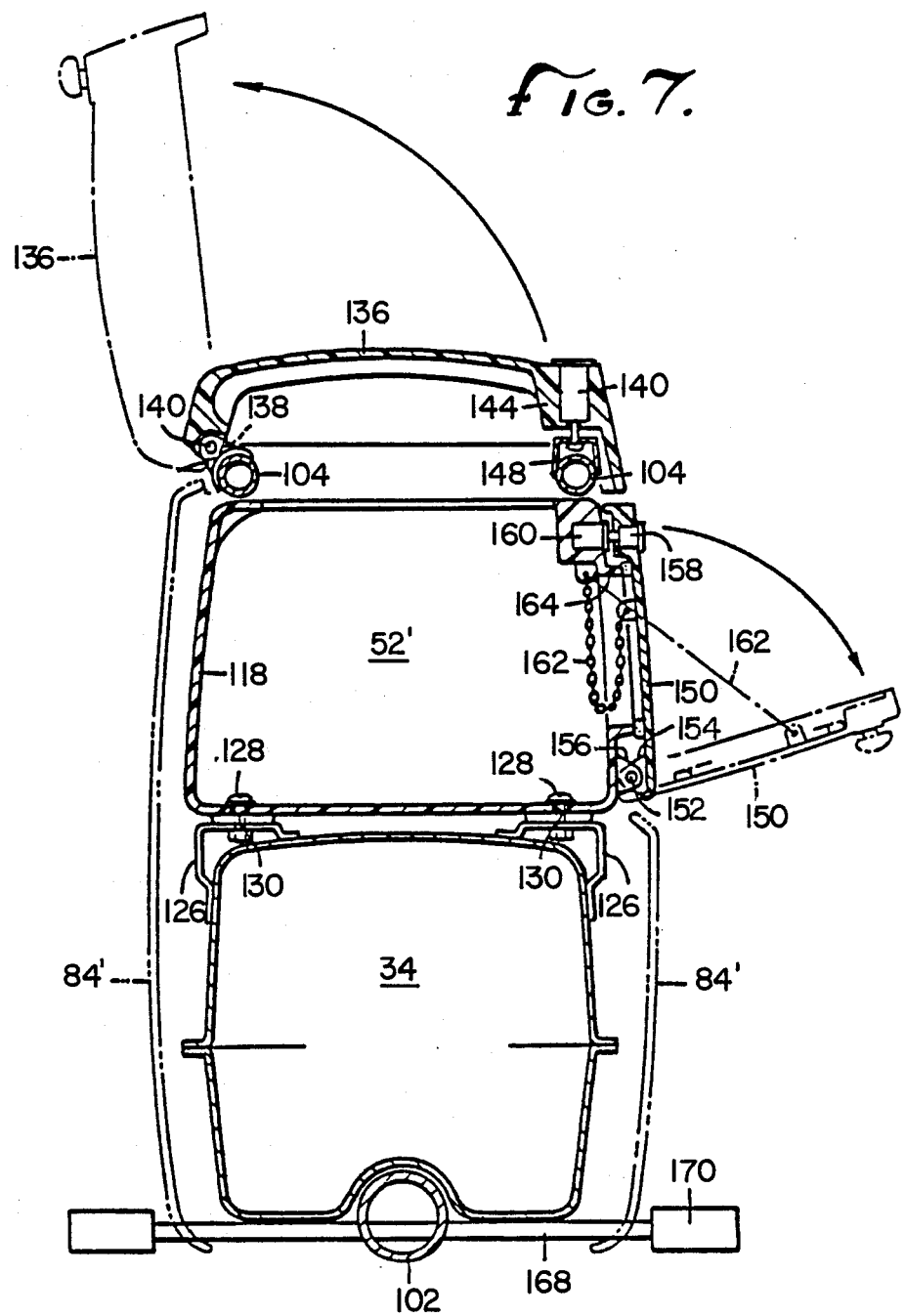
FIG. 7 is a sectional view taken along line VII—VII of FIG. 6.
Figure 8:
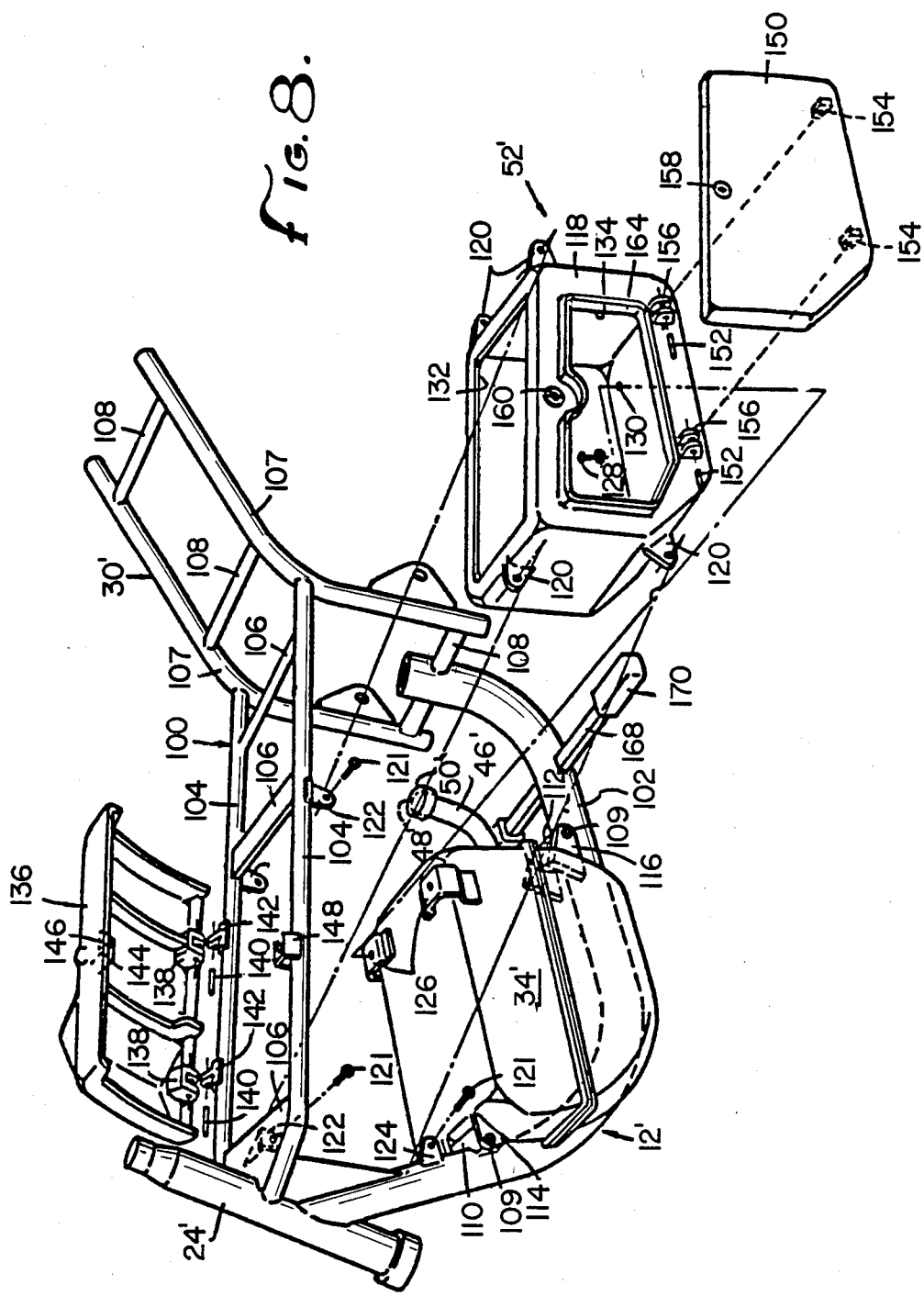
FIG. 8 is an exploded oblique representation of the principal parts of the embodiment of FIG. 6.
Figure 9:
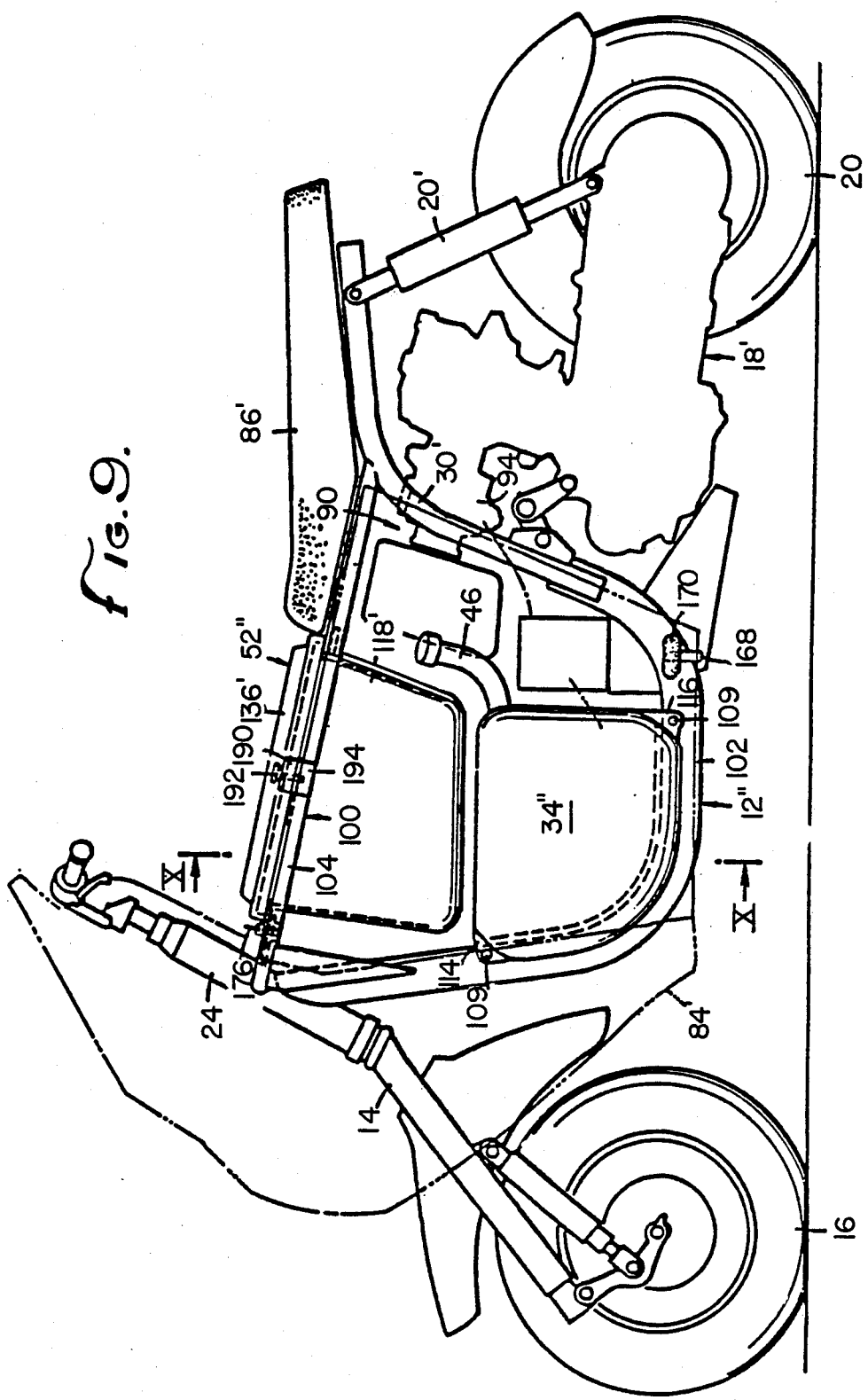
FIG. 9 is a side elevational view, similar to FIG. 1, illustrating a third embodiment of the invention.

A second embodiment of the invention is described with regard to FIGS. 6 to 8 wherein elements corresponding with those of the first embodiment are ascribed like identifying reference numerals. As shown in these figures the motorcycle 10' possesses a frame structure 12' comprising a head pipe 24', an upper frame, indicated generally as 100, and a lower pipe 102, and seat rails 30'. The upper frame 100 includes a pair of laterally spaced left and right frame pipes 104 that extend between and are weldedly connected at opposite ends to the head pipe 24' and the seat rails 30'. A plurality of cross members 106 laterally connect the pipes 104 at longitudinally spaced points along their length. The lower pipe 102 is a large diameter tubular member having a generally U-shape. The front end of the pipe 102 is integrally joined to the head pipe 24' and its rear end attaches the seat rails 30' that comprise a pair of left and right frame pipes 107 connected by a plurality of cross members 108.

The fuel tank 34' is mounted on the lower pipe 102 in straddling fashion and secured thereto by bolts 109 that extend through mounting lugs 110 and 112 on the pipe 102 and brackets 114 and 116 positioned at the upper front part and lower rear part, respectively, of the fuel tank. A fuel filler tube 46' projects upwardly from the rear upper part of the fuel tank 34' and has its opening 48' closed by cap 50'.

The storage container 52' in this illustrated embodiment comprises a plastic box 118 that is mounted on the fuel tank 34' and disposed within the space surrounded by the upper frame 100 and the lower pipe 102. The box 118 is provided with mounting projections 120 that permit it to be connected via bolts 121 to brackets 122 integrally attached to cross members 106 and that cooperates with a mount 124 formed on the lower pipe 102. Vertical support for the container 52' is provided by the fuel tank 34' via mount seats 126 that receive screws 128 which extends through screw holes 130 drilled in the bottom of the box 118.

As shown, the box 118 has access openings 132 and 134 formed on its top and left lateral side, respectively. The top opening 132 is closed by a cover 136 that is pivotally mounted on the right frame pipe 104 by the cooperation of U-shaped hinges 138 spaced along one side of the cover and connected via pins 140 to mounts 142 on the pipe 104. A projection 144 from the longitudinal center of the other side of the cover 136 is provided with a lock device 146 that cooperates with a receiving piece 148 provided on the left frame pipe 104. Thus, when the cover 136 is closed, the projection 144 is received in the receiving piece 148 and locked therein by the lock device 146.

The side opening 134 of box 118 is closed by a cover 150 having one longitudinal side pivotally connected via pins 152 that extend through hinges 154 formed on the inner side of the cover and U-shaped mount brackets 156 which project from the side of the box 118. The other side of the cover 150 contains a lock device 158 adapted to engage a receiving piece 160 on the box 118 above the opening 134 when the cover is closed. Chain 162 connected between the cover 150 and the box 118 is provided to limit pivotal movement of the cover. Also, a flange 164 extends outwardly from about the entire periphery of the side opening 134 to engage the inner peripheral side of the cover 160 in order to secure the cover in its closed position.

Similar to the embodiment of FIGS. 1 to 5, the motorcycle 10' contains an air cleaner 88' and carburator 94' positioned under the seat 86' and connected to the outer end of an inlet system 90' of the power unit 18. Numeral 166 indicates an opening lid in the cowling 84' to permit access to the fuel filler tube 46' and numeral 168 is a laterally elongated bar that extends through the lower pipe 102 and that has foot rests 170 on each end.

The operation of this embodiment of the invention is as follows. The storage container 52' is positioned in the space formed by the upper frame 100 and lower pipe 102 and fastened to the upper surface of the fuel tank 34'. As described, provision is made in this embdiment of the storage container 52' for access to its interior via openings located both at the top and on the side thereof, which openings can be closed by closure covers that may be lockingly secured to the container box. The provision of an access opening on the side of the storage container has particular utility for accessing the container in inclement weather thereby preventing rainwater from entering the container interior.

It should be appreciated that, while two access openings are provided in this embodiment of the invention, a storage container having the top opening eliminated is equally applicable.

FIGS. 9 through 12 illustrate another embodiment of the invention that can be applied to a motorcycle frame structure 12" that is substantially identical to the frame structure 12' of FIGS. 6 to 8 and where like numerals indicate corresponding structural elements. This embodiment has the advantage that the storage container 52" has provision for rendering it portable whereby it can be conveniently removed from the motorcycle frame structure and carried about.

Accordingly, in this embodiment of the invention the storage container 52", which similarly comprises a molded plastic box 118' having an opening 132' at the top, is removably mounted on the upper frame 100 of the motorcycle frame structure 12". As shown, the lateral width of box 118' is slightly less than the distance between the upper frame pipes 104 and its length is less than the distance between the cross members 106 so that can be freely inserted into and removed from the frame structure. The upper peripheral edge of the box 118' is provided with a projecting flange 172 having an L-shaped section, the sides of which engage the frame pipes 104 and the rear portion of which engages the intermediate cross member 106.

Projecting forwardly from the cental portion of the front part of the flange 172 is a mount tongue 174 that is adapted for engagement with the forwardmost cross member 106 via thumb screw 176 whereby the box 118' can be releasably retained on the frame structure 12". Upwardly extending projections 178 and 180 from the central part of the front and rear portions of flange 172 contain holes that pivotally mount handles 182 which can be raised to the position shown in FIG. 12 for transport of the storage container 52" or lowered to positions within the container interior for storage.

The cover 136' that closes the opening 132' is provided at longitudinally spaced positions along one side with hinges 184 that are pivotally connected via hinge pin 186 to mounting brackets 188 on the right hand frame pipe 104 of the upper frame 100. Centrally on the other side of cover 136' a formed projection 190 mounts a lock device 192 adapted for engagement with the cooperating receiving member 194 on the left hand frame pipe whereby the cover, when closed, can be lockingly secured over the opening 132' of storage container 52".

Figure 10:
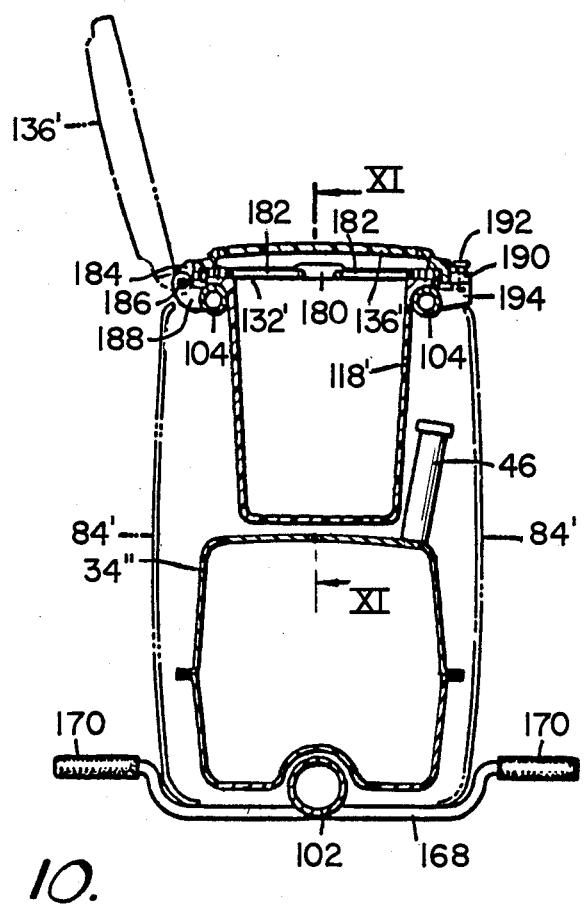
FIG. 10 is a sectional view taken along line X—X of FIG. 9.
Figure 11:
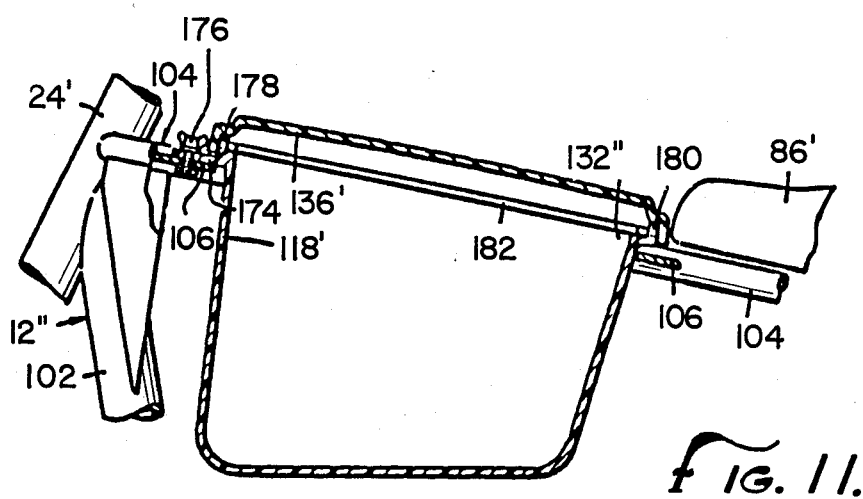
FIG. 11 is a sectional view taken along line XI—XI of FIG. 10.
Figure 12:
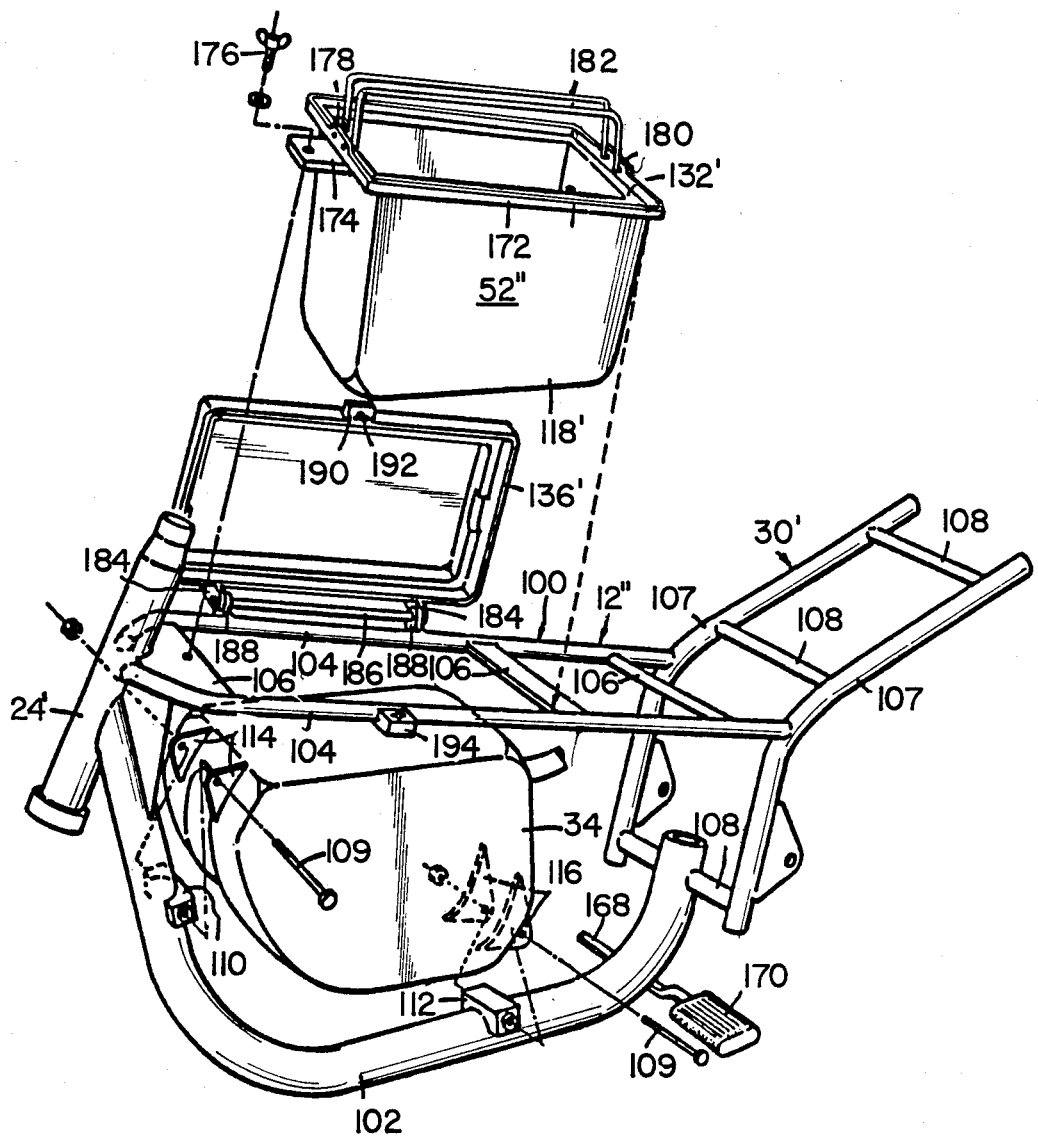
FIG. 12 is an exploded oblique representation of the principal parts of the embodiment of FIG. 9.

As is apparent from the foregoing the storage container 52" is mounted on the frame structure 12" by inserting the box 118' into the space btween the pipes 104 of the upper frame 100 and the front and intermediate cross members 106 whereupon the mount tongue 174 is secured to the front cross member 106 via the thumb screw 176. Accordingly, the box 118 can be mounted on the frame structure as shown in FIGS. 10 and 11, whereby articles can be placed into or taken from the box interior through the opening 132' the the top thereof. Thus, even if the motorcycle is surrounded by other vehicles, or the like, in a confined space, access to the interior of the storage container 52" is not hindered. Further, since the storage container 52" is located above the fuel tank 34" the possibility of soiling stored articles by fuel spillage is avoided.

The described arrangement permits locking of the closure cover 136' to prevent entry to the interior of the box 118' by the engagement of the lock device 192 with the receiving member 194 when the cover is closed. Furthermore, after the cover 136' is open, as shown by the chain line in FIG. 10, the handles 182 can be grasped and the box 118' moved upward to separate it from the motorcycle frame structure 12" whereupon it can be carried.

The embodiment of the invention illustrated in FIGS. 13 to 15 contains a cover 136" for the storage container 52''' that is advantageously formed to accommodate components of an audio unit, or the like. In this embodiment, the box 118" is sized to fit within the space defined by frame pipes 104 and the forwardmost and intermediate cross members 106 of the motorcycle frame structure 12". Laterally extending side flanges 172' and front and rear mount tongues 174' engage the respective frame pipes 104 and cross members 106 for supporting the box 118". A thumb screw 176 releasably connects the rear mount tongue 174' to the adjacent cross member 106. The cover 136" is adapted for pivotal mounting by means of a pivot pin 196 that secures pivot mounts 198 upstanding from the front cross member 106 to brackets 200 extending from the front end of the box 118". Lock device 192' on the cover in engagement with the receiving member 194' serves to lock the cover in its closed positon over the opening 132' to the cross member 106.

As shown, the surface 202 of the forward portion of the cover 136" is rearwardly inclined and adapted for reception of an audio speaker 204. An operating switch 206 mounted rearwardly of the speaker 204 and electrically connected thereto is readily accessable to the rider. Screen material 208 attached to the cover 136" serves t protect the operating parts of the speaker.

The foregoing indicates that the described invention provides an esthetically attractive motorcycle organization having improved running performance derived from a lower center of gravity that is produced by locating the fuel tank in a lower region of the frame structure and the storage container above it. By means of this arrangement the danger of soiling articles carried in the storage container by fuel spillage is avoided. Moreover, the invention enables easy access to the storage container interior even when the motorcycle is closely surrounded by other parked vehicles, or the like and, according to one embodiment, the storage container can be constructed for ready removal from the frame structure and portable.

It will be understood that various changes in the details, materials and arrangements of parts which have been herein described and illustrated in order to explain the nature of invention may be made by those skilled in the art within the principle and scope of the invention as expressed in the following claims.

I claim:

1. A motorcycle-type vehicle wherein the rider straddles the vehicle, comprising:
    a frame structure supportive of said rider and arranged for mounting a steerable front wheel, a power unit, and a rear wheel driven by said power unit,
    said frame structure including structural members supportively positioning a fuel tank intermediate said front and rear wheels and a storage container spaced vertically above said fuel tank.

2. The vehicle according to claim 1 in which said frame structure includes a head pipe at a forward portion of said frame structure and seat rails spaced rearwardly from said head pipe, said head pipe steerably mounting said front wheel and said seat rails pivotally suspending said rear wheel; mutually vertically spaced first and second support means extending between and being attached to said head pipe and said seat rails; said fuel tank mounted on said first support means and said storage container mounted on said second support means.

3. The vehicle according to claim 2 in which said first and second support means comprise tubular structural members extending on triangular spacing between said head pipe and said seat rails.

4. The vehicle according to claim 3 in which said tubular structural members comprise a pair of laterally spaced down tubes and a main tube intermediate and vertically spaced from said down tubes.

5. The vehicle according to claim 4 in which said main tube supports said storage container and said down tubes support said fuel tank.

6. The vehicle according to claim 4 in which said main tube supports said fuel tank and said down tubes support said storage container.

7. The vehicle according to claim 2 in which said storage container comprises a body having generally rectangularly arranged sides forming a hollow open topped receptacle; and a closure cover pivotally mounted with respect to said body for closing the open top thereof.

8. The vehicle according to claim 7 in which said main tube supports said fuel tank; means on said fuel tank for vertically supporting said storage container body; and means on said down tubes for pivotally mounting said closure cover in overlying relation to the open top of said body.

9. The vehicle according to claim 8 including a plurality of longitudinally spaced pivot mounts on one of said down tubes; means on said closure cover for pivotally connecting one side of said closure cover to said pivot mounts; releasable latch means on the other side of said closure cover; and means on said other down tube for releasably engaing said latch means.

10. The vehicle according to claim 7 in which said storage container body further includes an opening in one of the vertical sides thereof; and a closure cover pivotally attached to said body side for releasably closing said opening.

11. The vehicle according to claim 7 in which said storage container body is detachable from said support means; and means forming handles attached to said body for transport thereof when said body is detached from said support means.

12. The vehicle according to claim 7 in which said storage container body includes longitudinally extending flanges projecting laterally from opposed sides of said body; and means forming a cowling detachably engaging each of said flanges.

13. The vehicle according to claim 11 in which said tubular structural members comprise a pair of laterally spaced down tubes disposed on an upper portion of said frame structure; means forming flanges projecting outwardly from said container body; said flange means being operative to engage said down tubes for supporting said storage container body; a plurality of longitudinally spaced pivot mounts on one of said down tubes; means in said closure cover for pivotally connecting one side of said closure cover to said pivot mounts; releasable latch means on the other side of said closure cover; and means on said other down tube for releasably engaging said latch means.

14. The vehicle according to claim 7 including an article holder on said closure cover accessable to said rider.

15. The vehicle according to claim 14 in which said article is an audio unit.

* * * * *